United States Patent
Cho et al.

(10) Patent No.: US 7,929,590 B2
(45) Date of Patent: Apr. 19, 2011

(54) METHOD AND APPARATUS FOR MULTIPLEXING DATA AND CONTROL INFORMATION IN WIRELESS COMMUNICATION SYSTEMS BASED ON FREQUENCY DIVISION MULTIPLE ACCESS

(75) Inventors: Joon-Young Cho, Gyeonggi-do (KR); Ju-Ho Lee, Gyeonggi-do (KR); Hwan-Joon Kwon, Gyeonggi-do (KR); Yun-Ok Cho, Gyeonggi-do (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/661,001

(22) Filed: Mar. 8, 2010

(65) Prior Publication Data

US 2010/0172337 A1 Jul. 8, 2010

Related U.S. Application Data

(60) Continuation of application No. 12/481,337, filed on Jun. 9, 2009, now Pat. No. 7,697,631, which is a division of application No. 11/416,393, filed on May 3, 2006, now Pat. No. 7,613,245.

(30) Foreign Application Priority Data

May 3, 2005 (KR) ................... 2005-37294

(51) Int. Cl.
*H04L 27/30* (2006.01)
(52) U.S. Cl. ........ 375/146; 375/295; 375/260; 370/465; 370/479

(58) Field of Classification Search ........... 375/260, 375/267, 285, 295, 299, 140, 141, 146, 203, 375/210, 319, 321, 344, 464, 465, 474, 475, 375/480
See application file for complete search history.

(56) References Cited

U.S. PATENT DOCUMENTS

| 5,659,569 A | 8/1997 | Padovani et al. |
| 5,790,551 A | 8/1998 | Chan |
| 5,924,043 A | 7/1999 | Takano |
| 6,584,088 B2 * | 6/2003 | Miya .................. 370/335 |
| 2005/0135308 A1 * | 6/2005 | Vijayan et al. ......... 370/330 |
| 2006/0262870 A1 | 11/2006 | Khan |
| 2007/0053449 A1 | 3/2007 | Adachi |
| 2007/0189151 A1 | 8/2007 | Pan et al. |

FOREIGN PATENT DOCUMENTS

| CN | 1484449 A | 3/2004 |
| JP | 2000-236313 | 8/2000 |
| JP | 2008-536359 | 4/2008 |
| RU | 2104615 C1 | 2/1998 |
| RU | 2114508 C1 | 8/1998 |
| RU | 2189696 C2 | 9/2000 |
| WO | WO 98/35514 A2 | 8/1998 |

* cited by examiner

*Primary Examiner* — Dac V Ha
(74) *Attorney, Agent, or Firm* — McDermott, Will & Emery

(57) ABSTRACT

A signal transmission apparatus includes a symbol block generator configured to generate a first symbol block by multiplexing data information and control information in a symbol period, and a transmitter configured to transmit the first symbol block over a wireless communication network. In certain configurations, the transmitter is configured to transmit a predetermined number of symbol blocks within a transmit time interval.

21 Claims, 9 Drawing Sheets

METHOD AND APPARATUS FOR MULTIPLEXING DATA AND CONTROL INFORMATION IN WIRELESS COMMUNICATION SYSTEMS BASED ON FREQUENCY DIVISION MULTIPLE ACCESS

PRIORITY

This application is a continuation of U.S. Patent Application bearing Ser. No. 12/481,337 filed on Jun. 9, 2009, which is a divisional of U.S. Patent Application bearing Ser. No. 11/416,393 filed at the U.S. Patent and Trademark Office on May 3, 2006, which claims the benefit under 35 U.S.C. §119 (a) of a Korean Patent Application filed in the Korean Industrial Property Office on May 3, 2005 and assigned Serial No. 2005-37294, the entire disclosures of which are hereby incorporated by reference.

BACKGROUND OF THE INVENTION

1. Field of the Invention

The present invention relates to a wireless communication system based on frequency division multiple access. More particularly, the present invention relates to a method and apparatus for multiplexing and transmitting data and control information in a wireless communication system based on frequency division multiple access.

2. Description of the Related Art

Recent developments in broadcasting and mobile communication systems technology has led to the wide use of an Orthogonal Frequency Division Multiplexing (OFDM) transmission scheme. The OFDM scheme eliminates the interference between multi-path signals, which is frequently found in wireless communication channels. Also, the OFDM scheme guarantees the orthogonality between multiple access users and facilitates an efficient use of resources. Therefore, the OFDM scheme is available for high speed data transmission and broadband systems more than the conventional Code Division Multiple Access (CDMA) scheme. However, the OFDM scheme is a multi-carrier transmission scheme, in which transmission data is distributed to multiple sub-carriers and is then transmitted in parallel. This causes the OFDM scheme to increase the Peak-to-Average Power Ratio (PAPR) of the transmission signals.

A large PAPR causes distortion of output signals in a Radio Frequency (RF) power amplifier of a transmitter. Therefore, in order to solve such a problem, the transmitter requires power back-off to reduce the input power to the amplifier. Therefore, when the OFDM scheme is applied to the uplink of a mobile communication system, a terminal must perform the power back-off for the transmission signals, which results in the reduction of the cell coverage.

Interleaved Frequency Division Multiple Access (IFDMA) is being actively researched as a solution to solve the PAPR problem of the OFDM technology. The IFDMA guarantees the orthogonality between the multiple access users like the OFDM and is a technology based on a single sub-carrier, which shows a very low PAPR of transmission signals. Applying the IFDMA to a mobile communication system reduces the problem of cell coverage reduction due to the PAPR increase.

FIG. 1 illustrates a structure of a typical IFDMA transmitter.

Although the structure shown in FIG. 1 uses a Fast Fourier Transform (FFT) unit 104 and an Inverse Fast Fourier Transform (IFFT) unit 106, exemplary embodiments of the present invention are not limited to the shown structure and can be implemented by additional structures. The implementation that uses the FFT unit 104 and the IFFT unit 106 is advantageous because it facilitates an easy change of IFDMA system parameters without a high hardware complexity.

The OFDM and the IFDMA may have the following differences in the aspect of transmitter structure. In addition to the IFFT unit 106 which is used for multi-carrier transmission in the OFDM transmitter, the IFDMA transmitter includes the FFT unit 104 located before the IFFT unit 106. Therefore, the transmission modulation (TX) symbols 100 in FIG. 1 are input to the FFT unit 104 block by block, each of which includes M number of transmission modulation symbols. The block is referred to as "symbol block," and the period at which the symbol block is input to the FFT unit is referred to as "symbol block period." The signals output from the FFT unit 104 are input to the IFFT unit 106 at equal intervals, so that the IFDMA transmission signal elements are transmitted in the frequency domain by sub-carriers of equal intervals. In this process, it is usual for the input/output size N of the IFFT unit 106 to have a larger value than that of the input/output size M of the FFT unit 104. In the OFDM transmitter, the transmission symbol blocks 100 are directly input to the IFFT unit 106 without passing through the FFT unit 104 and are then transmitted by multiple sub-carriers, thereby generating a PAPR with a large value.

In the IFDMA transmitter, the transmission symbols are pre-processed by the FFT unit 104 before being processed by the IFFT unit 106. This occurs even though the transmission symbols are finally processed by the IFFT unit 106 before being transmitted by multiple carriers. The pre-processing of the transmission symbols makes it possible, due to the counterbalancing between the FFT unit 104 and the IFFT unit 106, to have an effect similar to that which occurs when the output signals of the IFFT unit 106 are transmitted by a single sub-carrier, thereby achieving a low PAPR. Finally, the outputs of the IFFT unit 106 are converted to a serial stream by a Parallel-to-Serial Converter (PSC) 102. Before the serial stream is then transmitted, a Cyclic Prefix (CP) or guard interval is attached to the serial stream as it is in the OFDM system, to prevent interference between multi-path channel signal elements.

FIG. 2 illustrates a structure of a transmitter based on a Localized Frequency Division Multiple Access (LFDMA) technique, which is similar to the IFDMA technique. The LFDMA technique also guarantees the orthogonality between multiple access users, is based on single carrier transmission, and can achieve a PAPR lower than that of the OFDM. As illustrated in FIGS. 1 and 2, the difference between the LFDMA and the IFDMA in the view of transmitter structure is that the outputs of the FFT unit 204 turn into inputs to the IFFT unit 206, which have sequential indexes following the last index of the FFT unit 204. In the frequency domain, the LFDMA signals occupy the band constituted by adjacent sub-carriers used when the outputs of the FFT unit 204 are mapped into the inputs of the IFFT unit 206. In other words, in the frequency domain, the IFDMA signals occupy the sub-carrier bands (sub-bands) distributed at an equal interval, and the LFDMA signals occupy the sub-band constituted by adjacent sub-carriers.

In order to apply the IFDMA and LFDMA based systems to a broadcasting or mobile communication system, it is necessary to transmit data and to control information and a pilot signal for demodulation and decoding of the data in a receiver. The pilot signal has a guaranteed pattern between a transmitter and a receiver. Therefore, when a received signal has a distortion due to a wireless fading channel, the receiver can estimate and eliminate, based on the pilot signal, the distortion in the received signal due to the wireless fading channel. The control information includes a modulation scheme applied to the transmitted data, a channel coding scheme, a data block size, and Hybrid Automatic Repeat Request (HARQ)-related information such as a serve packet ID. By receiving the control information, the receiver can understand the information applied to the transmitted data to perform various operations including demodulation and decoding of the received data.

According to the CDMA technique widely applied to current mobile communication systems, the data, control information, and pilot signal are transmitted by using different channelization codes. This allows the receiver to separate and detect the signals without interference. According to the OFDM technique, the data, control information, and pilot signal are transmitted by different sub-carriers or after being temporally divided.

Since the control information is not a large quantity of information capable of totally occupying one time slot, application of the time division-based multiplexing scheme may result in an unnecessary waste of resources. When the control information is transmitted by a separate sub-carrier different from that which carries the data as it does in the OFDM scheme, it is problematic in that the transmitted signal has an increased PAPR.

Accordingly, there is a need for an improved method and apparatus for multiplexing data and control information to lower a PAPR of a transmitted signal and to facilitate resource efficiency in an IFDMA or LFDMA-based communication system.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and an apparatus for multiplexing data and control information to lower a PAPR of a transmitted signal and to facilitate the efficient use of resources in an IFDMA or LFDMA-based communication system.

It is another object of an exemplary embodiment of the present invention to provide a method and an apparatus for multiplexing data and control information at an FFT input side within one FFT block period in an IFDMA or LFDMA-based communication system.

It is also another object of an exemplary embodiment of the present invention to provide a method and an apparatus for multiplexing data by distributing control information in each symbol block period within a Transmission Time Interval (TTI) in an IFDMA or LFDMA-based communication system.

In order to accomplish this object, an apparatus for transmitting data in a frequency division multiple access based communication system is provided. The apparatus includes a symbol block generator, a Fast Fourier Transform (FFT) unit, and an Inverse Fast Fourier Transform (IFFT) unit. The symbol block generator generates a symbol block in a predetermined symbol block period within one Transmission Time Interval (TTI) when control information to be transmitted exists in the TTI. Also, the symbol block includes the control information and data to be transmitted and the TTI includes multiple symbol block periods. A Fast Fourier Transform (FFT) unit performs FFT on the symbol block and an Inverse Fast Fourier Transform (IFFT) unit performs IFFT on signals output from the FFT unit and then transmits the signals.

In accordance with another aspect of an exemplary embodiment of the present invention, a method for transmitting data in a frequency division multiple access based communication system is provided. A symbol block is generated in a predetermined symbol block period within one Transmission Time Interval (TTI) when control information to be transmitted exists in the TTI. The symbol block includes the control information and data to be transmitted and the TTI includes multiple symbol block periods. Fast Fourier Transform (FFT) is performed on the symbol block, Inverse Fast Fourier Transform (IFFT) is performed on the FFTed signals, and then the IFFTed signals are transmitted.

In accordance with another aspect of an exemplary embodiment of the present invention, an apparatus for receiving data in a frequency division multiple access based communication system is provided. The apparatus includes a Fast Fourier Transform (FFT) unit, an Inverse Fast Fourier Transform (IFFT), a control information demodulator/decoder, and a data demodulator/decoder. The FFT unit receives signals received during one symbol block period and performs FFT on the signals. The IFFT unit performs IFFT on the signals output from the FFT unit, thereby restoring symbol blocks. When the symbol block period is a predetermined symbol block period in which data and control information are multiplexed, the control information demodulator/decoder, receives modulation symbols corresponding to predetermined IFFT output indexes from among the symbol blocks and demodulates and decodes the modulation symbols, thereby outputting control information. The data demodulator/decoder receives modulation symbols corresponding to the other IFFT output indexes except for indexes corresponding to the control information from among the symbol blocks by using the control information, demodulates and decodes the received modulation symbols, and then outputs the data.

According to another aspect of an exemplary embodiment of the present invention, a method for receiving data in a frequency division multiple access based communication system is provided. The method includes the steps of: receiving signals received during one symbol block period and performing Fast Fourier Transform (FFT) on the signals by an FFT unit; restoring symbol blocks from the FFTed signals by an Inverse Fast Fourier Transform (IFFT) unit; when the symbol block period is a predetermined symbol block period in which data and control information are multiplexed, receiving modulation symbols corresponding to predetermined IFFT output indexes from among the symbol blocks from the IFFT unit and demodulating and decoding the modulation symbols, thereby outputting control information; and receiving modulation symbols corresponding to the other IFFT output indexes except for indexes corresponding to the control information from among the symbol blocks from the IFFT unit by using the control information, demodulating and decoding the received modulation symbols, and then outputting the data.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary embodiment of the present invention proposes a method of multiplexing data and control information in at least one symbol block from among multiple symbol blocks included in one TTI and simultaneously transmitting the multiplexed data and control information. The method of multiplexing and simultaneous transmission can achieve a lower PAPR and results in a more efficient use of resources compared to the existing methods. The control information includes a modulation scheme applied to transmission data, a channel coding scheme, a data block size, and a Hybrid Automatic Repeat Request (HARQ)-related information such as a sub-packet ID. This is included together with control information, such as Channel Quality Indicator (CQI) or ACK/NACK, when the control information is necessary.

Figure 3:
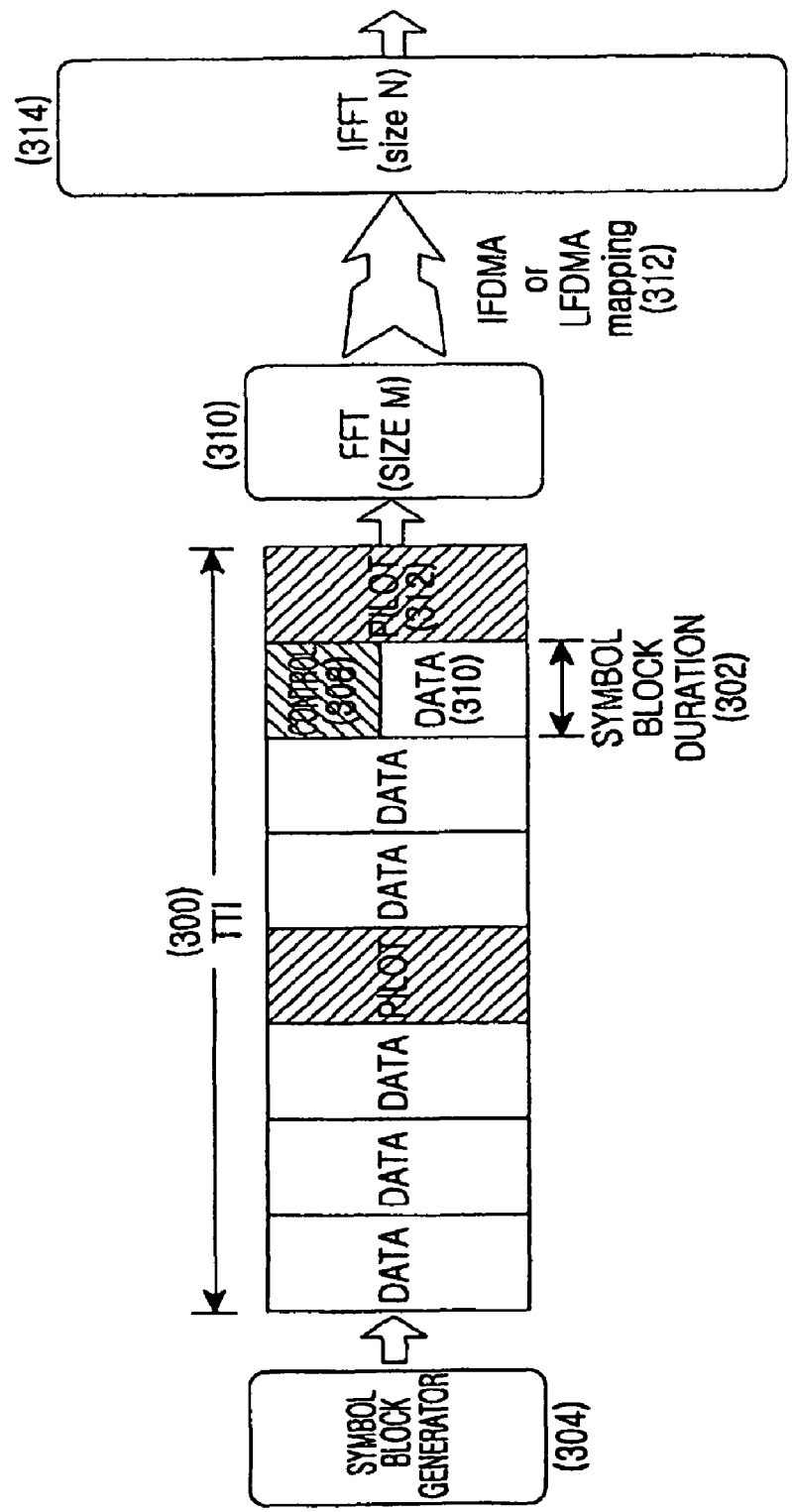
FIG. 3 illustrates an apparatus for multiplexing and transmitting data, control information, and a pilot signal according to a first exemplary embodiment of the present invention.

FIG. 3 illustrates an apparatus for multiplexing and transmitting data, control information, and a pilot signal according to a first exemplary embodiment of the present invention.

As shown in FIG. 3, a symbol block generator 304 of a transmitter generates a symbol block by multiplexing data, control information, or pilot signals to be transmitted for each symbol block period. The exemplary embodiment of FIG. 3 illustrates one Transmission Time Interval (TTI) which includes eight symbol block periods.

The symbol block generator 304 determines whether control information exists within the current TTI 300. When control information exists within the current TTI 300, the symbol block generator 304 generates a symbol block including the control information and data in a predetermined symbol block period 302 within the TTI 300. The symbol block generator 304 generates symbol blocks which include data or a pilot signal without control information in other symbol block periods. Each symbol block includes M number of symbols, which are mapped to M number of inputs of the FFT unit 310.

Figure 1:
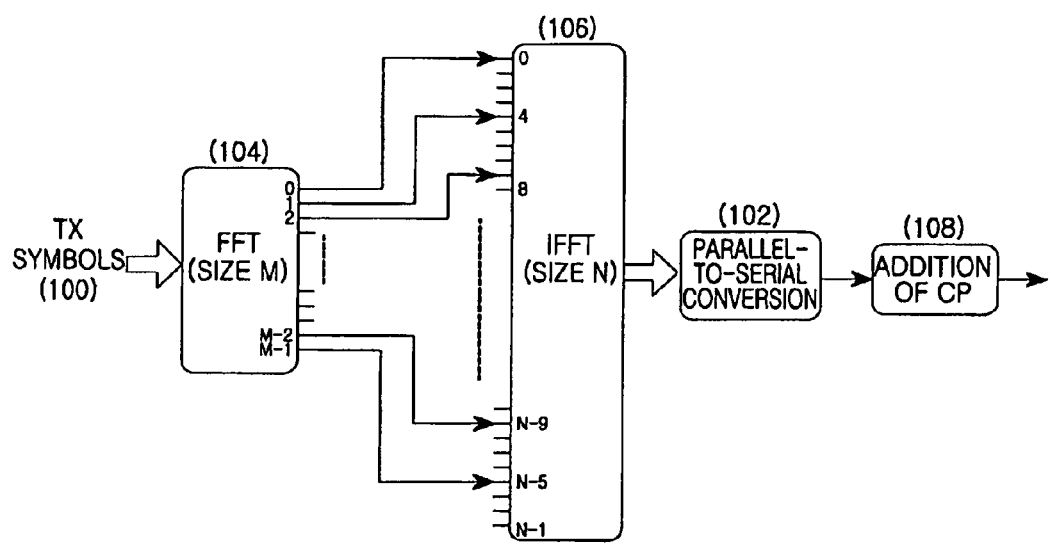
FIG. 1 illustrates a structure of a conventional IFDMA transmitter.

In FIG. 3, the IFDMA or LFDMA transmission technique is to transmit the output signals of the FFT unit 310 by multi-carriers by using the IFFT unit 314. Therefore, N number of outputs from the IFFT unit 314 are converted to a serial stream by the PSC 102 as shown in FIG. 1, which is then transmitted with a CP attached thereto. At this time, each period in which the N outputs are generated corresponds to the symbol block period.

Figure 2:
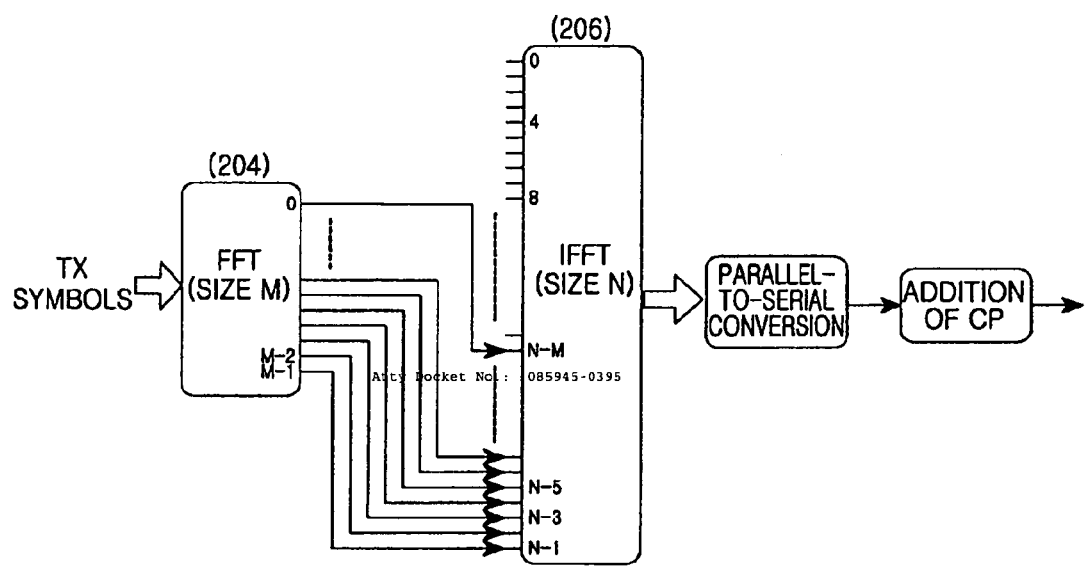
FIG. 2 illustrates a structure of a conventional LFDMA transmitter.

Therefore, each of the eight symbol blocks in the TTI 300 is input to the FFT unit 310 at a corresponding symbol block period. Each of the symbol blocks is an FFT input block input through all input taps of the FFT unit 310 and has the same size as the tap size M of the FFT unit 310. Further, the M outputs of the FFT unit 310 are mapped to the inputs of the IFFT unit 314 according to the mapping rule corresponding to the IFDMA or LFDMA technique to be applied which is similar to the techniques applied FIGS. 1 and 2. Finally, the outputs of the IFFT unit 314 are converted to a serial stream, which is then transmitted together with a CP attached thereto.

Figure 9:
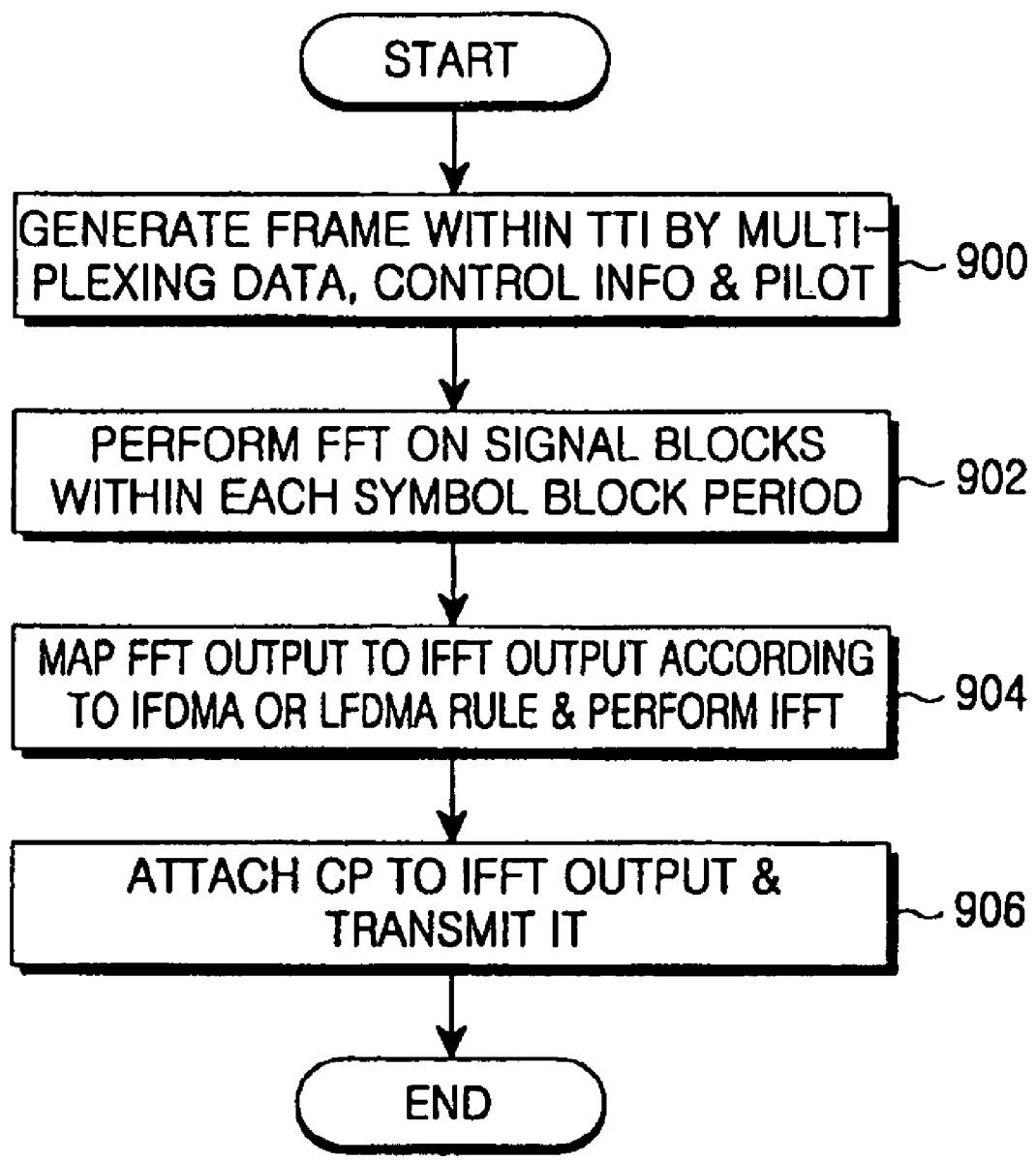
FIG. 9 is a flowchart showing an operation of a transmitter according to an exemplary embodiment of the present invention.

FIG. 9 is a flowchart illustrating an operation of a transmitter according to an exemplary embodiment of the present invention.

In step 900, the transmitter generates frames in TTI, that is, transmission data, by multiplexing data, control information, and pilot signals to be transmitted. When there is control information to be transmitted during one TTI, the transmitter inserts the control information into a symbol block predetermined within the TTI, and inserts data into a remaining portion of the symbol block. The pilot signal is included in and transmitted by one symbol block, and the data is included in a portion of the symbol block including the control signal and other symbol blocks except for the symbol block including the pilot signal. In step 902, the transmitter performs FFT on a symbol block of a corresponding period at each symbol block period.

In step 904, the outputs of the FFT unit are mapped to the inputs of the IFFT unit according to the mapping rule corresponding to the applied IFDMA or LFDMA technique to be applied, and IFFT is then performed. In step 906, the transmitter attaches a CP to the output of the IFFT unit and then transmits it.

As described above, the method proposed by the first exemplary embodiment of the present invention is to multiplex the data 306 and the control information 304 at the FFT input side during one symbol block period. The pilot signal 308 is transmitted during one entire symbol block period. This method of transmission is different from that of the data 306 and the control information 304. In the case of IFDMA or LFDMA transmission, when the pilot signal 308 is multiplexed together with data within the same symbol block period, it is difficult to perform channel estimation and normally demodulate the received data and control information. However, as noted from the following description regarding the operation of a receiver, even when the control information 304 is multiplexed together with the data 306 within one symbol block period, it is possible to demodulate and decode the received data 306 and the control information 304.

The method for multiplexing data 306, the control information 304, and the pilot signal 308 is applicable even to an IFDMA or LFDMA transmitter which is not based on the FFT and IFFT.

Multiplexing the data and control information in one IFDMA symbol stream as shown in FIG. 3 makes it possible to obtain a lower PAPR, in comparison with the case data and control information which are divided in the frequency domain and are then transmitted according to the IFDMA or LFDMA scheme by using different sub-carrier bands as in an OFDM system. Further, the method as shown in FIG. 3 facilitates a more efficient use of resources, in comparison with the case of temporally multiplexing the data and the control information and then transmitting them in different symbol block periods by IFDMA or LFDMA. This results from the fact that the control information usually has a small volume, and allocation of one symbol block period to the transmission of the control information would result in allocation of an unnecessarily large quantity of resources to the transmission of the control information and cause a reduction of many resources which could otherwise be used for the data transmission. This problem becomes more severe when it is necessary to transmit a large quantity of data at a high data rate.

Hereinafter, a description will be given regarding the frame format of a transmission IFDMA or LFDMA signal for normal demodulation and decoding of data by a receiver when the data and control information are multiplexed as described above. According to the quantity of data to be transmitted or the condition of a transmitted radio channel, different modulation schemes and coding schemes may be applied to the data transmission. When the HARQ technique is applied, different HARQ control information may be transmitted according to the retransmission situations. Therefore, normal demodulation of data is possible only when the receiver has recognized the control information by demodulating and decoding the control information.

The transmission format of the control information should be defined to be fixed to a specific transmission format or as one format used between the transmitter and the receiver at the time of radio link setup to facilitate normal demodulation of the control information by the user. The receiver can normally demodulate and decode the control information when the control information is mapped and transmitted with an always fixed modulation scheme and channel coding scheme, fixed number of control information bits, and fixed time slots and FFT inputs. For example, the exemplary embodiment of FIG. 3 illustrates the control information convolutionally encoded with a coding rate of ⅓ and then transmitted according to the QPSK modulation scheme, and includes L number of modulation symbols. The L modulation symbols are transmitted after being applied to the FFT inputs with input indexes of 0~(L−1) in the second symbol block period within the TTI. Then, the receiver can demodulate and decode the control information by using the transmission format of the control information, which is already recognized by the receiver. If the control is not transmitted with a fixed format, the receiver must try to detect the format for various possible formats by applying a blind format detection method.

Figure 4:
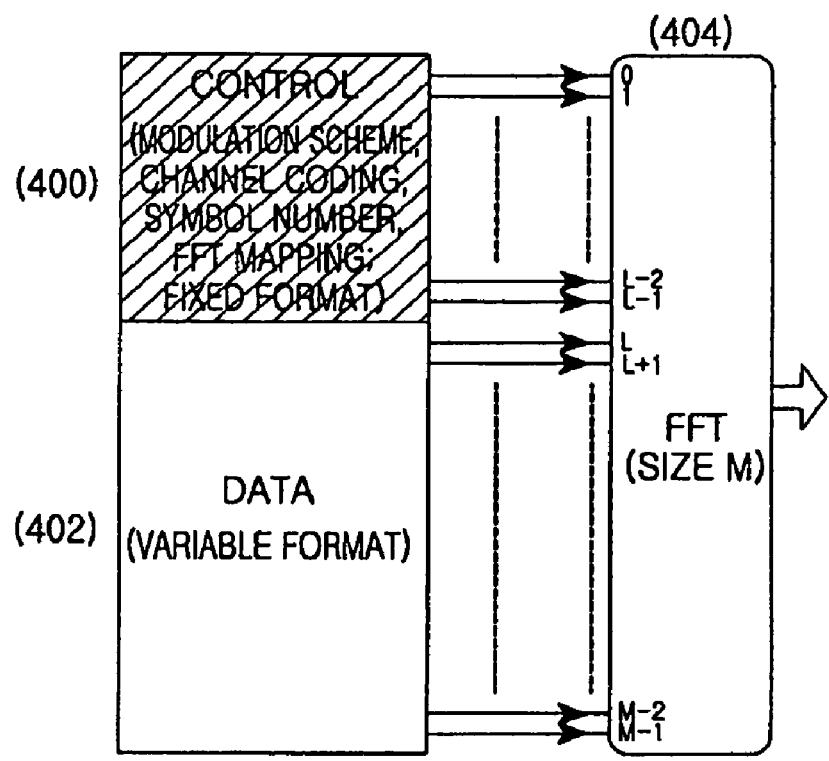
FIG. 4 illustrates the FFT mapping in the symbol block period in which the control information and the data are multiplexed according to the first exemplary embodiment of the present invention.

FIG. 4 illustrates the FFT mapping in the symbol block period in which the control information and the data are multiplexed according to the first exemplary embodiment of the present invention. Referring to FIG. 4, the control information 400, including L modulation symbols, is applied to the inputs of the FFT unit 404 with input indexes of 0~(L−1), and the data is applied to the other FFT inputs, such as, the FFT inputs with the input indexes of 0~(L−1). It should be noted that the locations to which the modulation symbols of the control information 400 are mapped are not limited to the upper indexes of 0~(L−1). The control information may be mapped to any L number of taps known in advance to the transmitter and the receiver from among the M input taps of the FFT unit.

Figure 5:
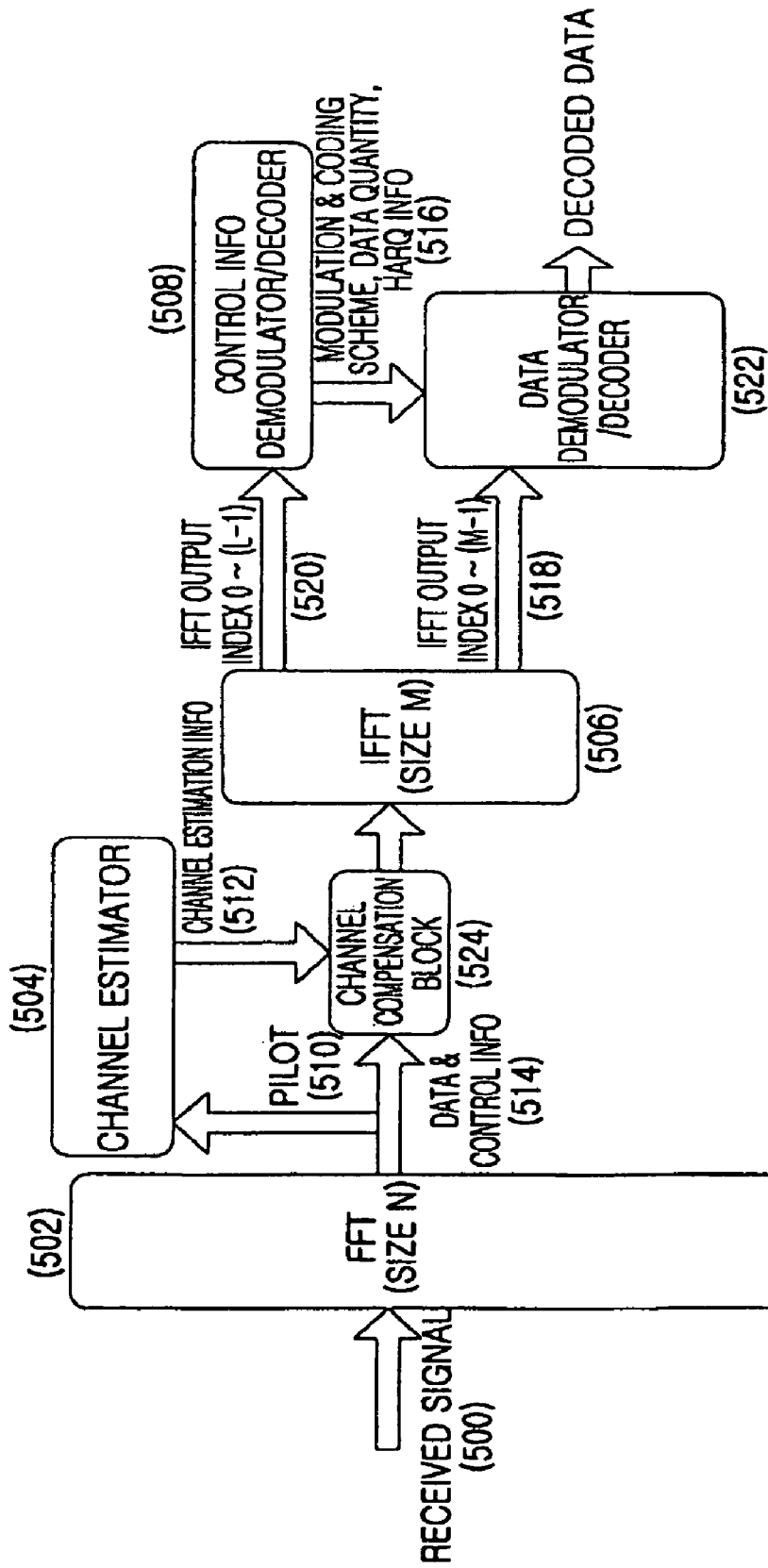
FIG. 5 illustrates a structure of a receiver according to the first exemplary embodiment of the present invention.

FIG. 5 illustrates a structure of a receiver according to the first exemplary embodiment of the present invention.

Referring to FIG. 5, the receiver first eliminates the CP from the received signal, performs FFT by the FFT unit 502, extracts the pilot signal from the output of the FFT unit 502, and then performs channel estimation. For example, the FFT unit 502 of the receiver converts the received signal input to the FFT unit 502 to a frequency domain signal, corresponding to the IFFT unit 314 shown in FIG. 3. When the output from the FFT unit 502 corresponds to the pilot 510, the output of the FFT unit 502 is input to the channel estimator 504. When the symbol block period in which the output of the FFT 502 occurs is a predetermined pilot period in one TTI as shown in FIG. 3, the output of the FFT unit 502 is considered as the pilot 510.

The channel estimator 504 generates channel estimation information 512 by estimating the channel condition from the pilot 510 and transfers the generated channel estimation information 512 to the channel compensation block 524 so that the IFFT unit 506 can demodulate the data and control information. Thereafter, the output from the FFT unit 502 is channel-compensated by using the channel estimation information 512 by the channel compensation block 524. The extraction of the pilot 510 by the channel estimator 504 and the channel compensation by the channel compensation block 524 may be performed by the output side of the IFFT unit 506.

The channel-compensated signal 526 is input to the IFFT unit 506 according to the IFDMA or LFDMA mapping rule applied in the transmitter, and is then subjected to the demodulation and decoding.

In the case of the symbol block period including the control information and data, since the control information has been transmitted after being applied to the input indexes of 0~(L−1) of the FFT unit 404, the IFFT unit 506 of FIG. 5 applies the outputs 520 with the output indexes of 0~(L−1) to the control information demodulator/decoder 508, so that it is possible to extract the control information. Further, in the case of data, since pure data may sometimes be transmitted in one symbol block period, all the outputs of the IFFT unit 506, such as, the outputs 518 with the output indexes of 0~(M−1) are applied to the data demodulator/decoder 522. When the modulation and coding schemes used by the transmitted data for data transmission, the quantity of data, the HARQ control information 516, etc. have been transferred to the data demodulator/decoder 522 by the demodulation and decoding of the control information in the symbol block period corresponding to the control information, the decoded data is finally output from the data demodulator/decoder 522.

Figure 8:
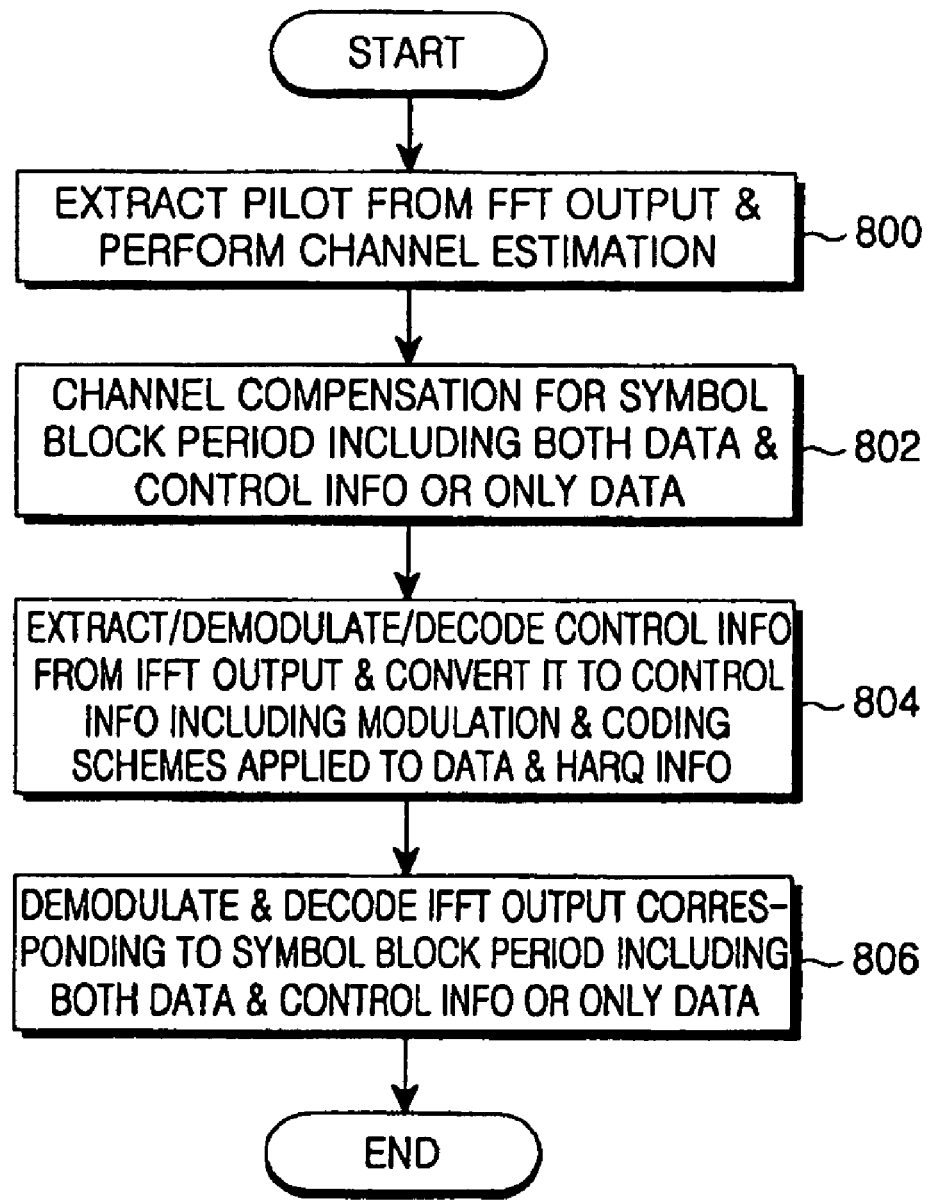
FIG. 8 is a flowchart for illustrating the operation of the receiver according to a first exemplary embodiment of the present invention.

FIG. 8 is a flowchart for illustrating the operation of the receiver according to a first exemplary embodiment of the present invention.

In step 800, the receiver eliminates the CP from the received signal, performs FFT, extracts the pilot from the FFT output, and then performs channel estimation. In step 802, when the FFT output corresponds to a symbol block period including data and control information or a symbol block period including only data, the FFT output is channel-compensated by the channel compensation block 524.

The signal channel-compensated in step 804 is input to the IFFT unit according to the IFDMA or LFDMA mapping rule applied in the transmitter. The output with an index corresponding to the control information from among the IFFT output corresponding to the symbol block period including the data and the control information is converted through demodulation and decoding to the control information including modulation and coding schemes applied to the data, HARQ control information, etc.

In step 806, the control information is used to restore data by demodulating and decoding the IFFT output corresponding to the symbol block period including the data and the control information or the symbol block period including only the data.

Figure 6:
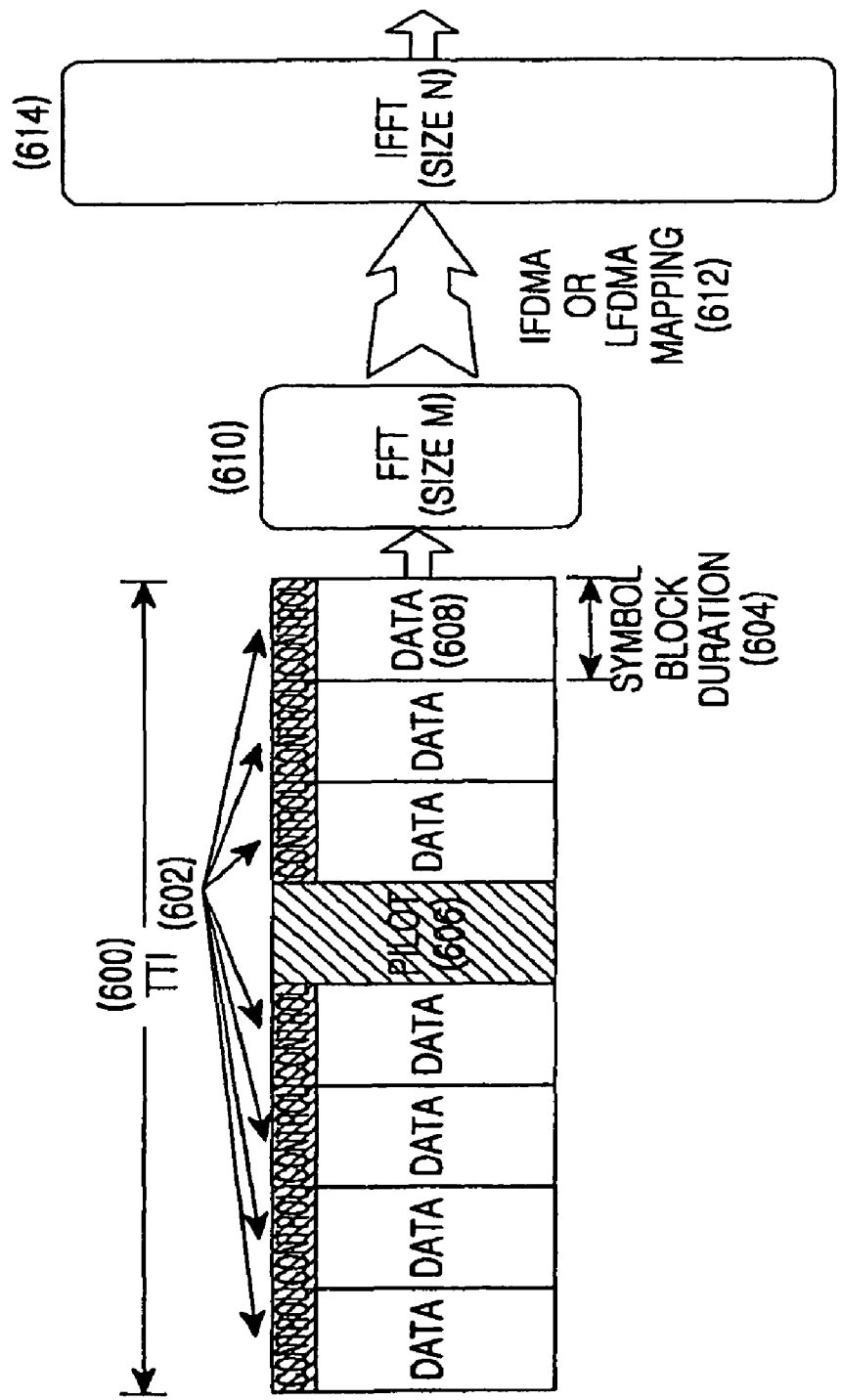
FIG. 6 illustrates a method for multiplexing control information and data according to a second exemplary embodiment of the present invention.

FIG. 6 illustrates a method for multiplexing control information and data according to a second exemplary embodiment of the present invention.

The second embodiment is different from the first embodiment in that the control information 602 is transmitted after being distributed to multiple symbol block periods within one TTI 600. The core of the second exemplary embodiment of the present invention is that the control information 602 is multiplexed with the data in each symbol block period 604 and is transmitted after being distributed to the multiple symbol block periods in the TTI 600, thereby obtaining time diversity in a fading channel, which can improve the performance for detection of the control information. Referring to FIG. 6, in the symbol block period in which data and control information are multiplexed, the control information includes K number of symbols, data includes (M−K) number of symbols, and the control information and the data are applied to the input indexes of 0~(K−1) and K~(M−1) of the FFT unit 610, respectively. The parameters K and M have values which are determined by the quantity of necessary control information and the quantity of data to be transmitted, respectively.

In the first exemplary embodiment of the present invention, because of the applied modulation and coding scheme, the number of all the symbols, the FFT input mapping, etc. in the control information 602 are defined in advance between the transmitter and the receiver, the receiver can demodulate and decode the control information based on the pre-defined transmission format of the control information. Further, in the second exemplary embodiment of the present invention, it is possible to transmit the pilot 606 in the fourth symbol block period within one TTI, in order to reduce the pilot overhead, in comparison with the case of the first exemplary embodiment of the present invention.

In the first exemplary embodiment of the present invention, the transmission signal is mapped to the IFFT input 612 according to the IFDMA or LFDMA technique after passing through the FFT unit 610, is processed by the IFFT unit 614, and is then transmitted together with a CP attached thereto. The structure of the receiver for processing the transmission signal is basically analogous to those of the first exemplary embodiment shown in FIGS. 5 and 8. Differently from the first embodiment, the demodulation and the decoding of the data symbols are performed after the control information is obtained through reception, demodulation and decoding of all the symbols of the control information distributed in the multiple symbol block periods.

The flowcharts in FIGS. 8 and 9, according to the first exemplary embodiment of the present invention, are applicable to the second exemplary embodiment of the present invention.

Figure 7:
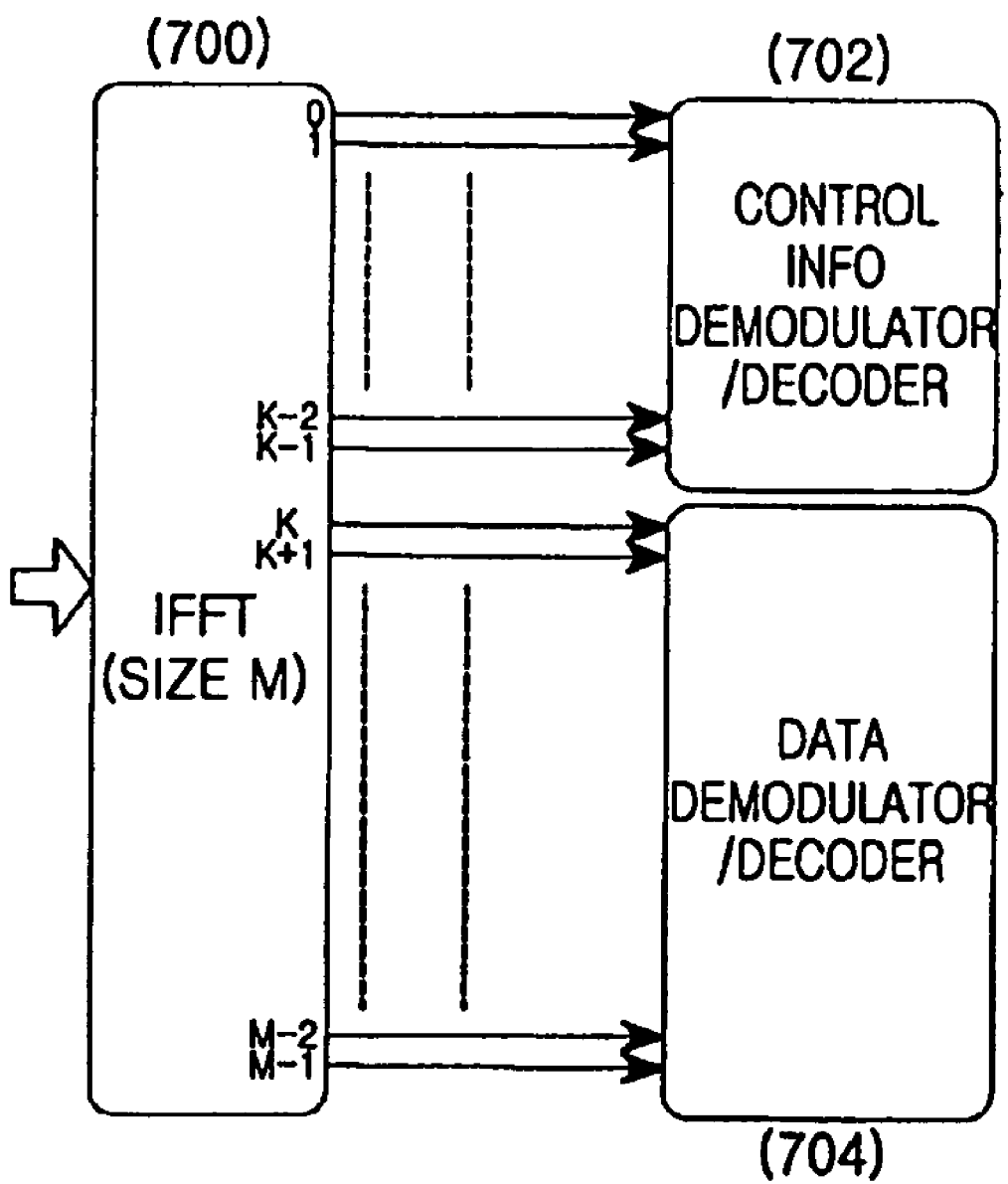
FIG. 7 illustrates a structure for mapping IFFT outputs to the control information demodulator/decoder and the data demodulator/decoder in the receiver according to the first or second exemplary embodiment of the present invention.

FIG. 7 illustrates a structure for mapping of IFFT outputs to the control information demodulator/decoder and the data demodulator/decoder in the receiver according to the first or second exemplary embodiment of the present invention.

As noted from FIG. 7, in the receiver, the outputs with indexes of 0~(K−1) and K~(M−1) are applied to the control information demodulator/decoder 702 and the data demodulator/decoder 704, respectively. Each demodulator/decoder 702 or 704 can perform normal demodulation and decoding of the control information and the data.

According to an exemplary embodiment of the present invention as described above, data and control information are multiplexed in the same symbol block and are then transmitted by a single carrier by using an IFDMA or LFDMA scheme. Therefore, an exemplary embodiment of the present invention can improve the efficiency in use of resources and achieve a lower Peak-to-Average Power Ratio (PAPR), in comparison with the existing time division or frequency division multiplexing method.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A signal transmission apparatus comprising:
    a symbol block generator configured to generate a first symbol block by multiplexing data information and control information in a symbol period; and
    a transmitter configured to transmit the first symbol block over a wireless communication network.

2. The signal transmission apparatus of claim 1, wherein the transmitter is configured to transmit a predetermined number of symbol blocks within a transmit time interval (TTI).

3. The signal transmission apparatus of claim 1, wherein the transmitter is configured to transmit using a localized frequency domain multiple access (LFDMA) technique or an interleaved frequency domain multiple access (IFDMA) technique.

4. The signal transmission apparatus of claim 1, wherein the symbol block generator is further configured to generate a second symbol block having no control information.

5. The signal transmission apparatus of claim 4, wherein the second symbol block comprises data information or a pilot signal.

6. The signal transmission apparatus of claim 4, wherein the second symbol block comprises data information and a pilot signal.

7. The signal transmission apparatus of claim 1, further comprising:
    a Fast Fourier Transform (FFT) unit for performing an FFT on the first symbol block; and
    an Inverse Fast Fourier Transform (IFFT) unit for mapping, in accordance with a mapping rule, signals output from the FFT unit, performing an IFFT on the mapped outputs signals, and transmitting the IFFTed output signals.

8. The signal transmission apparatus of claim 7, wherein the mapping rule comprises an interleaved frequency domain multiple access (IFDMA) mapping.

9. The signal transmission apparatus of claim 7, wherein the mapping rule comprises a localized frequency domain multiple access (LFDMA) mapping.

10. The signal transmission apparatus of claim 1, wherein the control information comprises at least one of a modulation information, a channel coding information, a symbol number-related information, and the mapping rule.

11. A signal transmission method comprising:
    generating a first symbol block comprising multiplexed data information and control information in a symbol period;

transmitting the first symbol block over a wireless communication network.

12. The signal transmission method of claim 11, wherein the transmitting comprises transmitting a predetermined number of symbol blocks within a transmit time interval (TTI).

13. The signal transmission method of claim 11, wherein the transmitting comprises transmitting using a localized frequency domain multiple access (LFDMA) technique or an interleaved frequency domain multiple access (IFDMA) technique.

14. The signal transmission method of claim 11, further comprising:
generating a second symbol block having no control information.

15. The signal transmission method of claim 14, wherein the second symbol block comprises data information or a pilot signal.

16. The signal transmission method of claim 14, wherein the second symbol block comprises data information and a pilot signal.

17. The signal transmission method of claim 11, further comprising:
performing a Fast Fourier Transform (FFT) on the first symbol block;
mapping the FFTed symbols according to a mapping rule;
performing an Inverse Fast Fourier Transform (IFFT) on the mapped signals; and
transmitting the IFFTed signals.

18. The signal transmission method of claim 11, wherein the step of mapping comprises mapping the FFTed symbols using a mapping rule comprising an interleaved frequency domain multiple access (IFDMA) mapping.

19. The signal transmission method of claim 11, wherein the step of mapping comprises mapping the FFTed symbols using a mapping rule comprising a localized frequency domain multiple access (LFDMA) mapping.

20. The signal transmission method of claim 11, wherein the control information comprises at least one of a modulation information, a channel coding information, a symbol number-related information, and the mapping rule.

21. A signal transmission apparatus comprising:
means to generate a first symbol block by multiplexing data information and control information in a symbol period; and
means to transmit the first symbol block over a wireless communication network.

* * * * *